United States Patent [19]

Gillespie

[11] 3,760,921
[45] Sept. 25, 1973

[54] CLUTCH DISC AND METHOD OF MAKING
[75] Inventor: Daniel C. Gillespie, Maywood, Ill.
[73] Assignee: Borg-Warner Corporation, Chicago, Ill.
[22] Filed: Sept. 15, 1971
[21] Appl. No.: 180,675

[52] U.S. Cl. ... 192/107 R, 113/116 D, 188/218 XL, 192/70.2
[51] Int. Cl. ............................................ F16d 13/60
[58] Field of Search ........................ 192/107 R, 70.2; 188/218 XL, 72.3; 113/116 D; 72/334, 335; 64/23

[56] References Cited
UNITED STATES PATENTS
1,780,710  11/1930  Kattwinkel .................... 192/107 R
3,438,464  4/1969   Barrington ..................... 192/70.2

OTHER PUBLICATIONS
Reprint of advertisement appearing reverse side of page 91 of "Design News" May 10, 1971

Primary Examiner—Charles J. Myhre
Assistant Examiner—Randall Heald
Attorney—Donald W. Banner et al.

[57] ABSTRACT

A clutch disc includes spline engaging teeth formed by swaging the sheet metal to provide a work hardened tooth having a face wider than the thickness of the sheet metal. The improved tooth strength and increased surface area permits reduction of sheet metal thickness in the order of one-third providing a more compliant disc and allowing the use of additional discs in a given axial length.

4 Claims, 10 Drawing Figures

PATENTED SEP 25 1973 3,760,921

CLUTCH DISC AND METHOD OF MAKING

BACKGROUND OF THE INVENTION

Clutch discs of the type used in multiple disc clutch packs are generally planar annularly shaped rings having spline engaging teeth arranged about an inner or outer edge thereof. Discs with inner teeth are alternated with discs having outer teeth to provide a clutch pack having a desired torque transmission capability. Usually alternate discs are provided with a friction facing material secured to a metallic core plate.

It is desirable that the metallic core plate be thin in order to minimize rotary inertia and to promote compliance of disc to disc contact. In some cases it is desirable to preform the disc to a dished or wave form to promote separation of the discs in the absence of an apply force. The use of such preformed discs makes a thin compliant core plate even more desirable since it more reaily flattens into compliance when an apply force is present.

In order for the discs to separate satisfactorily when the apply force is removed, it is necessary for the discs to slide axially along the spline portions of the mating parts.

The surface area presented by a spline tooth face often determined the thickness of the core plate since if the core plate were too thin it would cut into the spline portions of the mating parts. This can be a particularly troublesome limitation where the mating part is of a softer material than the core plate.

In the past, spline liners have been employed between the teeth of the core plate and the spline portion of the mating part to permit axial sliding movement of the clutch discs. This has been objectionable, however, in that it requires non-standard tooth forms and results in additional parts in the clutch assembly.

Another past practice has been to bend a small projection at right angles to the plane of the core plate to form a runner for engagement with the spline portion of the mating part. This is objectionable since it places limitations on the thickness and composition of materials which can be used in forming the core plate and because the blanking operation necessary to form the projection limits application to splines having a large root depth.

Another past practice has been to provide a large number of spline teeth such that the thickness and depth of a tooth multiplied by the number of teeth provides sufficient total area for avoiding cutting into the spline portions of the mating parts. An objection to a large number of spline teeth is that it requires the forming of additional spline surfaces in the mating parts.

SUMMARY OF THE INVENTION

The present invention provides an improved clutch disc formed of thin compliant sheet metal in which the sheet metal is swaged to provide a thickened work hardened spline tooth face having increased surface area for contact with mating spline portions of an associated clutch member.

Among the advantages provided by the present clutch disc are that the work hardened tooth permits greater latitude in the choice of materials from which the core plate is made; the increased surface area of the tooth face permits the use of thinner sheet metal stock from which the core plate is formed which in turn provides a more compliant disc having less rotary inertia and permits the use of additional discs in a given axial dimension, and the tooth face can be formed to match a great variety of spline shapes and sizes varying in curvature, angularity and root depth.

These and other advantages of the present invention will become more evident from an inspection of the accompanying drawings and consideration of the following description of a preferred embodiment thereof.

DESCRIPTION OF THE PREFERRED EMBODIMENT

Figure 1:
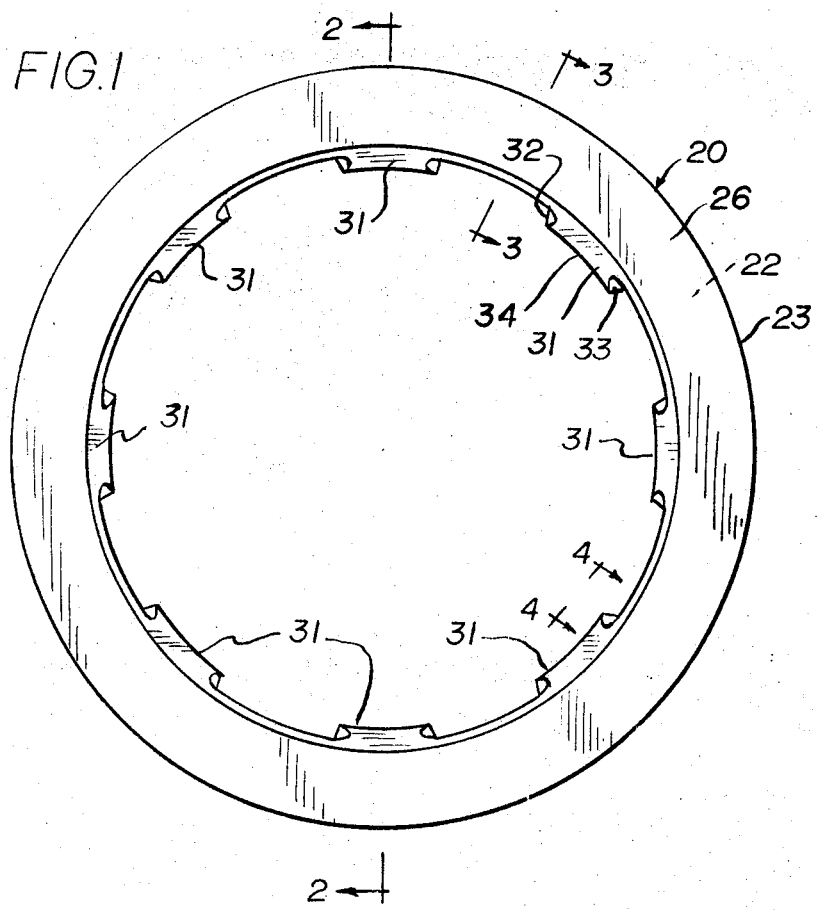
FIG. 1 is a plan view of a preferred form of the clutch disc according to the present invention.
Figure 2:
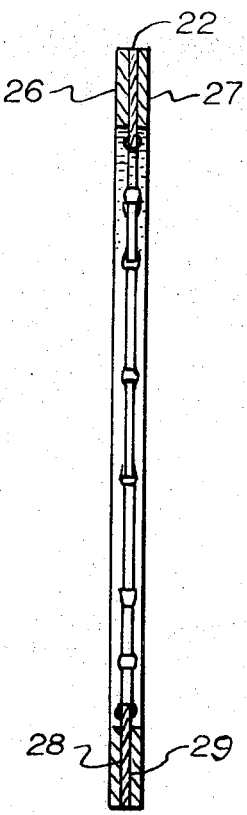
FIG. 2 is a section view taken along the line 2—2 of FIG. 1.

Referring now in more detail to the drawings the reference characters 20 and 21 generally indicate clutch discs according to the present invention. Clutch disc 20 is shown in the form of a sheet metal annulus having a web portion 22 defining an outer rim 23 and an inner rim 24. Web portion 22 is shown as being planar, however, if desired it may be preformed with a dished or wavy configuration to promote separation of the discs in the absence of an apply force. Friction facings 26 and 27 are secured to opposite surfaces 28, 29 of web 22. A series of circumferentially spaced drive teeth 31 extend inwardly from rim 24, eight teeth being shown for purposes of illustration. The number of teeth may be varied depending upon the torque to be transmitted by the disc and the nature of the associated clutch members with which the tooth is to be engaged.

The profile of a tooth in the plane of the disc is bounded by a circumferentially extending edge 34, and generally radially disposed edges 32, 33 defining faces or load bearing surfaces of the tooth. The generally radially disposed faces 32, 33 may be flat or curved as required to agree with straight sided or involute spline portions of an associated clutch member, and may depart from an exact radial as necessary to agree with the inclination of an associated spline face.

As illustrated, the tooth 31 has opposite load bearing surfaces or faces 32, 33 permitting the disc to drive or be driven in either direction of rotation. The illustrated profile of tooth 31 is for engagement with a form of spline used in the automotive industry which has a pair of straight sided spline faces inclined to form an included angle of 45°. Thus the tooth faces 32, 33 may depart from a radial depending upon the circumferential extent of a tooth and the distance from the center of the disc.

Figures 3, 4, 5:
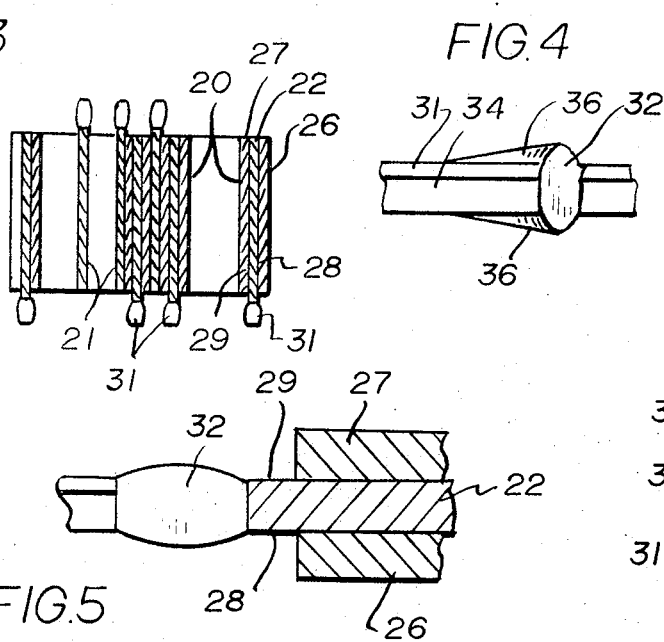
FIG. 3 is a fragmentary section view to enlarged scale taken along the line 3—3 of FIG. 1 and showing additional clutch discs as they would appear in a clutch pack.
FIG. 4 is a fragmentary view to enlarged scale of a spline tooth viewed in the direction of arrows 4—4 of FIG. 1.
FIG. 5 is a fragmentary view to enlarged scale similar to FIG. 4 showing a spline face.
Figure 6:
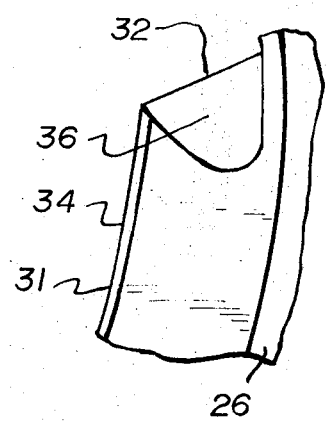
FIG. 6 is a view similar to FIGS. 4 and 5 showing a side of a spline tooth.

According to the present invention the desired profile of a tooth 31 is provided by cold forming the sheet metal by "swaging" or "upsetting" a portion of the tooth stock forming a protuberant portion 36 which is thicker than the sheet metal extending laterally beyond the opposite surfaces 28, 29 of the disc. The enlarged portion 36 forms a buttress like shape providing increased area for the face or load bearing surface 32 and gradually tapers as it extends circumferentially away from the face until it merges into the sheet metal. The shape of the buttress 36 as illustrated in FIGS. 4, 5 and 6 is a preferred form of the cold formed enlargement where it is desired to provide a flat angularly disposed face 32. Where other tooth profiles are desired, the shape of the enlargement may be varied to provide the desired shape and area for the face and support therefor. The shape and proportions of the protuberant portion 36 may be varied to provide the desired strength and surface area for the face 32 in view of the torque requirements and the nature of the associated parts with which the disc is to be engaged. For example, a large disc for use in agricultural implements which formerly required a metal thickness of 0.125 inches can be reduced to 0.080 inches using the tooth shapes shown in FIGS. 4, 5 and 6 and provide improved performance in that the thinner disc is more flexible and compliant. Similarly, in an automotive application, the metal thickness was reduced from 0.060 inches to 0.040 inches.

The clutch disc 20 including a metallic core plate with teeth on the inner rim and friction facings on opposite surfaces of the web represents one preferred embodiment of the invention. However, the cold formed teeth may be employed on a metal disc which does not include friction facing material, and may be disposed about the outer rim of the disc if desired. The clutch disc 21 illustrates an alternate form of disc which does not include friction facing material and in which the teeth are formed around the outer rim.

Where torque is to be transmitted between a pair of concentric clutch members by means of a disc clutch pack, the force exerted on the inner teeth is greater than the force exerted on the outer teeth because of the difference in the length of the moment arms. Accordingly, where the clutch members are of generally similar material, it is desirable to increase the area of the load bearing surfaces of the disc teeth engageable with the inner concentric clutch member. However, where the clutch members are of dissimilar material, for example, where the inner clutch member is of forged steel and the outer member is of cast aluminum, the area of the load bearing surfaces of the disc teeth engageable with the outer member may be more critical. In either case, clutch discs having teeth according to the present invention are beneficial in providing the desired surface area since the load bearing surface of a tooth can be made wider than the thickness of the sheet metal from which the disc is formed. A further benefit is that the thinner sheet metal stock will, in some designs, permit the use of additional discs in a given axial space available for the clutch pack thereby further increasing the available load bearing surface area.

Figure 7:
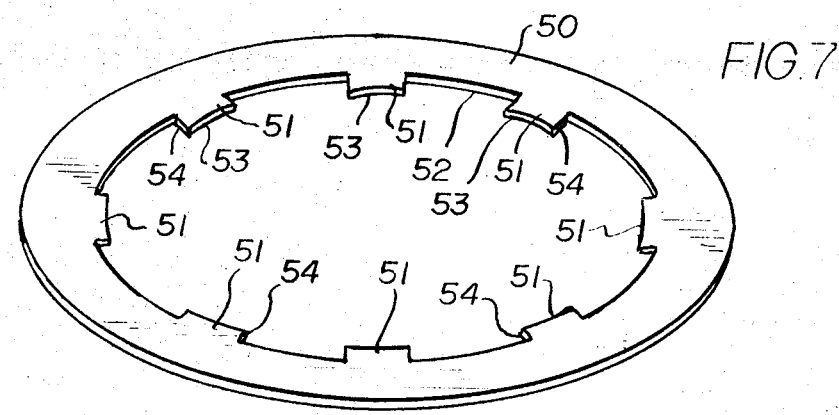
FIG. 7 is a perspective view of a core plate blank.
Figure 8:
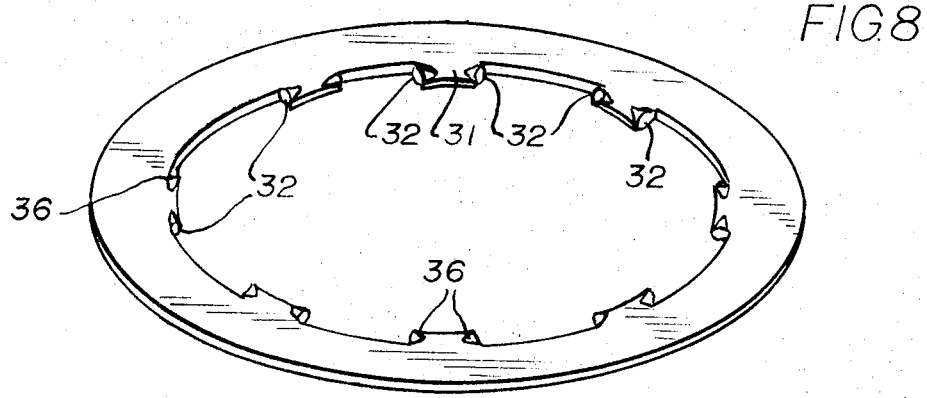
FIG. 8 is a view similar to FIG. 7 showing swaged spline teeth formed from the core plate blank.
Figure 9:
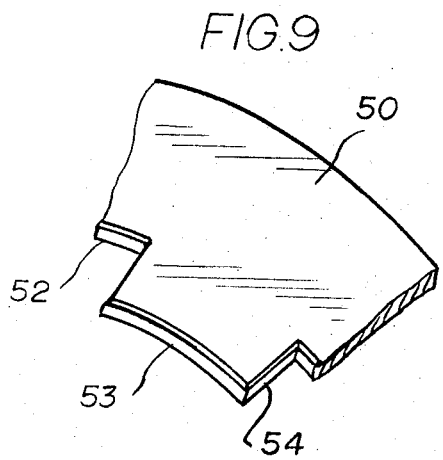
FIG. 9 is a fragmentary enlarged view of a portion of the blank shown in FIG. 7.
Figure 10:
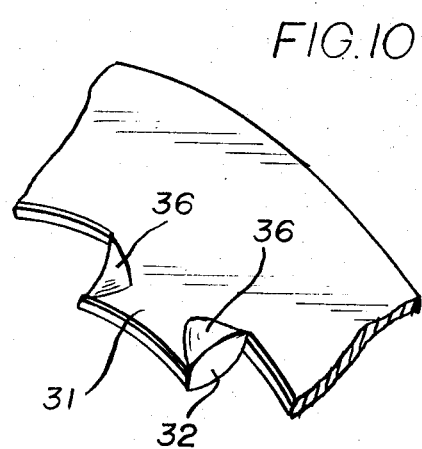
FIG. 10 is a view similar to FIG. 9 showing a swaged spline tooth formed in the blank.

FIGS. 7 and 8 illustrate steps in forming a clutch disc according to the present invention and FIGS. 9 and 10 illustrate the formation of a tooth thereon to enlarged scale.

A generally annular blank 50 is prepared from sheet metal stock of desired thickness having one or more co-planar tabs 51 extending inwardly from the inner rim 52 of the annulus. Each tab 51 has a circumferential edge portion 53 and one or more generally radially extending edge portions 54. A radial edge portion 54 of a tab 51 is upset in the circumferential direction to provide a tooth face 32 supported by the buttressing protuberance 36 which has improved strength as a result of the cold working of the material. Adjacent edge portions 54 are formed to provide the desired tooth profile in the plane of the blank having faces extending transversely beyond opposite surfaces of the blank.

Where a blank is prepared by means of typical industrial quality blanking dies, the edge surfaces of the blank undergo shearing distortion such that approximately one-third of the edge surface thickness is tapered with respect to the plane of the blank. The remaining two-thirds of the edge thickness extends generally perpendicularly with respect to the plane of the blank. Thus according to prior practice where the tooth profile is formed by stamping and deburring, the available surface area for a tooth face is limited to the perpendicular portion of the edge surface.

On the other hand, where a tooth is formed by upsetting edge portions of the blank, in accordance with the present invention, the area of the tooth face is increased to include the full metal thickness plus increments represented by the ends of the buttressing portions. For example, where the transverse dimension of the tooth face across the buttressing portions is increased to 140 percent of metal thickness, the resulting tooth face area is approximately one-third greater than the area of a machined face and approximately double the area available from a stamped tooth profile.

After formation of the teeth, friction facing material may be secured to the blank if desired to form a clutch disc 20. A disc such as 21 can be made by a similar procedure in which the blank is provided with tabs extending from the outer rim thereof.

What is claimed is:

1. A clutch disc including a substantially annular sheet metal web portion defining inner and outer rims having at least one integral co-planar tooth extending from one of said rims, said tooth having substantially radially and circumferentially disposed edge portions defining a preselected profile thereof, said tooth including a swaged upset portion of increased metal thickness immediately adjacent said radially disposed edge portion providing a load bearing surface defining a substantially radial tooth face extending transversely beyond respective side surfaces of said web portion.

2. A clutch disc according to claim 1 in which said upset portion of said tooth extends generally circumferentially from said load bearing surface merging into said web portion providing a buttress portion supporting said load bearing surface.

3. The method of making a clutch disc comprising the steps of stamping a sheet metal blank of substantially annular form having one or more co-planar tabs extending from a rim thereof, and upsetting an edge portion of at least one of said tabs simultaneously forming a tooth profile in the plane of said blank and increasing the metal thickness transverse to the plane of the blank.

4. The method of making a clutch disc according to claim 3 in which a generally radially disposed edge portion of said tab is upset in a circumferential direction forming said spline tooth profile having a work hardened face extending transverse to the plane of said blank beyond respective surfaces of said blank.

* * * * *